(12) United States Patent
Miyakawa et al.

(10) Patent No.: US 12,510,506 B2
(45) Date of Patent: Dec. 30, 2025

(54) ELECTROLYTE ANALYZER

(71) Applicant: Hitachi High-Tech Corporation, Tokyo (JP)

(72) Inventors: Takushi Miyakawa, Tokyo (JP); Taichiro Yamashita, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 226 days.

(21) Appl. No.: 18/276,157

(22) PCT Filed: Dec. 7, 2021

(86) PCT No.: PCT/JP2021/044855
§ 371 (c)(1),
(2) Date: Aug. 7, 2023

(87) PCT Pub. No.: WO2022/176327
PCT Pub. Date: Aug. 25, 2022

(65) Prior Publication Data
US 2024/0094160 A1    Mar. 21, 2024

(30) Foreign Application Priority Data
Feb. 18, 2021 (JP) .................... 2021-023904

(51) Int. Cl.
*G01N 27/28* (2006.01)
*G01N 27/30* (2006.01)
(Continued)

(52) U.S. Cl.
CPC ....... *G01N 27/4117* (2013.01); *G01N 27/283* (2013.01); *G01N 27/301* (2013.01); *G01N 27/42* (2013.01); *G01N 27/333* (2013.01)

(58) Field of Classification Search
CPC .. G01N 27/4117; G01N 27/301; G01N 27/42; G01N 27/416; G01N 27/333; G01N 27/283
See application file for complete search history.

(56) References Cited

U.S. PATENT DOCUMENTS 4,404,065 A * 9/1983 Matson .................. G01N 30/64
204/411
2016/0334358 A1   11/2016 Kishioka et al.
(Continued)

FOREIGN PATENT DOCUMENTS

JP    07-140106 A    6/1995
JP    H07-140106 A   6/1995
(Continued)

OTHER PUBLICATIONS

Extended European Search Report issued on Jan. 2, 2025 for European Patent Application No. 21926752.3.
International Preliminary Report on Patentability issued on Aug. 22, 2023 for PCT International Application No. PCT/JP2021/044855.
International Search Report, PCT/JP2021/044855, Jan. 20, 2022, 2pgs.

*Primary Examiner* — Alexander S Noguerola
(74) *Attorney, Agent, or Firm* — Volpe Koenig

(57) ABSTRACT

Problem
Provided is an electrolyte analyzer that allows reducing a load of a user in a replacement work compared with conventional one.
Solution
An electrolyte analyzer includes an ISE electrode 1 that includes at least one electrode, a reference electrode 2 that includes at least one electrode different from the ISE electrode 1, and a housing 200 that houses the electrodes of the ISE electrode 1 and the reference electrode 2. The housing 200 includes a pressing unit that presses the electrodes to one another, a first press switching unit 210 that switches the ISE electrode 1 between a secured state and a released state, and a second press switching unit 215 that switches the
(Continued)

reference electrode 2 between a secured state and a released state. The ISE electrode 1 and the reference electrode 2 are each switched between the secured state and the released state.

8 Claims, 7 Drawing Sheets

(51) Int. Cl.
  *G01N 27/411* (2006.01)
  *G01N 27/416* (2006.01)
  *G01N 27/42* (2006.01)
  *G01N 27/333* (2006.01)

(56) References Cited

U.S. PATENT DOCUMENTS

| | | |
|---|---|---|
| 2017/0059520 A1 | 3/2017 | Yang et al. |
| 2020/0363441 A1 | 11/2020 | Mougin |
| 2021/0165009 A1 | 6/2021 | Miyakawa et al. |

FOREIGN PATENT DOCUMENTS

| | | |
|---|---|---|
| WO | 2015/115303 A1 | 8/2015 |
| WO | 2019-198400 A1 | 10/2019 |

* cited by examiner

FIG. 6A
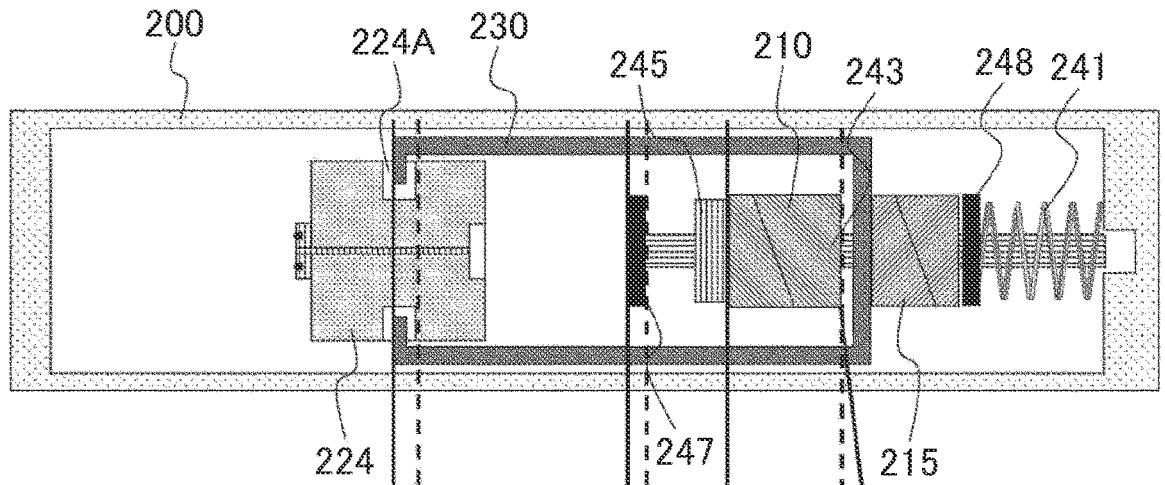
FIG. 6B
FIG. 7
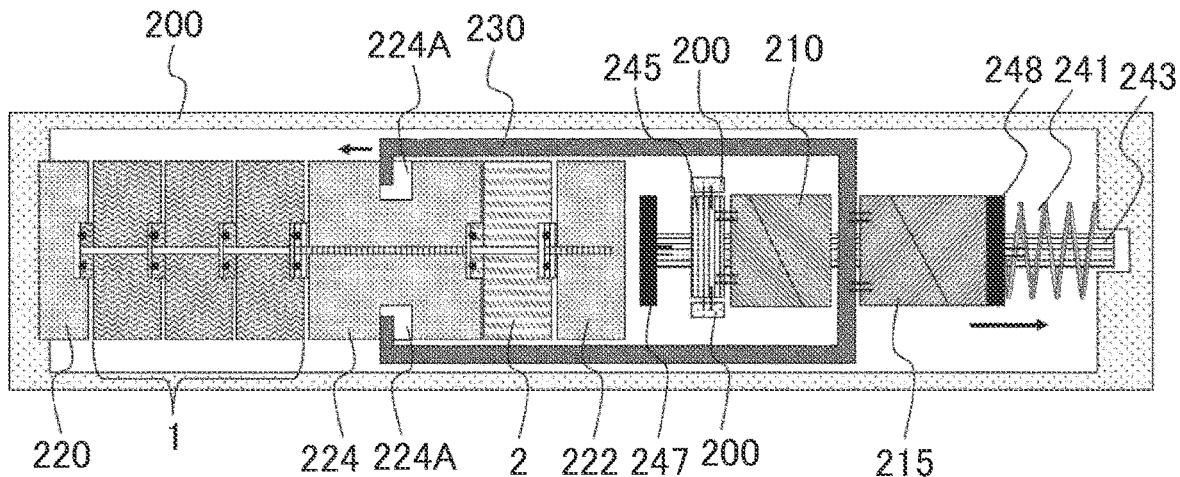

ELECTROLYTE ANALYZER

TECHNICAL FIELD

The present invention relates to an electrolyte analyzer.

BACKGROUND ART

As an example of an electrolyte analyzer that prevents contamination from being caused by different reagents coming into contact with an aspiration nozzle in work of replacing a reagent by a user, Patent Literature 1 describes that an electrolyte analyzer includes a nozzle support portion that is coupled to aspiration nozzles and is movable between a reagent container replacement position and a reagent aspiration position, a locking mechanism that is fitted to the nozzle support portion moved to the reagent container replacement position so as to fix the nozzle support portion at the reagent container replacement position, and an unlocking mechanism that can release the fitting of the locking mechanism to the nozzle support portion in a state in which power is supplied, and that, when a reagent container satisfies a predetermined condition, the unlocking mechanism is controlled to release the fitting of the locking mechanism to the nozzle support portion so as to cause the nozzle support portion to move to the reagent aspiration position.

CITATION LIST

Patent Literature

Patent Literature 1: International Publication No. 2019/198400

SUMMARY OF INVENTION

Technical Problem

The electrolyte analyzer described above in Patent Literature 1 is a device configured to measure the concentrations of specific electrolytes (sodium (Na), potassium (K), chlorine (Cl), and the like) contained in electrolyte solutions such as human blood and urine and measures the concentrations using an ion selective electrode.

In a general method for measuring the concentration of an electrolyte, first, serum as an electrolyte solution is directly supplied to an ion selective electrode or a sample solution diluted with a dilute solution is supplied to the ion selective electrode, and a potential between the supplied solution and a reference electrode solution is measured. Next, or before the above-described measurement, a flow type is mainly used to perform a procedure for supplying a standard solution to the ion selective electrode, measuring a potential between the supplied standard solution and the reference electrode solution in the same manner, and calculating the concentration of an electrolyte in the sample solution from the potential level between the two solutions.

In such a flow-type electrolyte analyzer, not only the reagents such as the dilute solution, the standard solution, and the reference electrode solution but also the ion selective electrode are used as consumables, and work of replacing the consumables is performed by a user.

As the ion selective electrode, two types of electrodes, measurement electrodes (hereinafter, referred to as ISE electrodes (ion selective electrodes) in some cases) for Na, K, and Cl according to measurement items, and a reference electrode, are used. In general, expiration dates of the ISE electrodes may be significantly different from an expiration date of the reference electrode, and the number of times that measurement can be performed with each of the ISE electrodes may be significantly different from the number of times that measurement can be performed with the reference electrode.

Each of the ISE electrodes and the reference electrode includes a flow passage having an electrode membrane. The ISE electrodes and the reference electrode are used in close contact with each other in, for example, an O-ring such that a liquid does not leak.

In a case where a user replaces each of the ISE electrodes and the reference electrode, each of the electrodes can be detached and attached by temporarily releasing contact portions between the electrodes.

Meanwhile, as described above, since the timing of replacing each of the electrodes may be different from the timing of replacing the other electrodes, even when an electrode is not replaced, it is inevitable that an internal liquid will leak due to temporal release of close contact. In this case, since it is necessary to take measures such as cleaning the electrodes that have been replaced and the electrode that is not replaced, there was a need to reduce the burden of cleaning on the user.

The present invention provides an electrolyte analyzer capable of reducing a burden on a user during replacement work, as compared with conventional techniques.

Solution to Problem

The present invention includes a plurality of means for solving the above-described problems, an example of the means includes a first electrode group that includes at least one electrode, a second electrode group that is different from the first electrode group and includes at least one electrode, and an electrode housing that houses the electrodes of the first electrode group and the second electrode group, the electrode housing includes a pressing unit that presses the electrodes against one another, a first switching unit that switches between a secured state and a released state of the first electrode group, and a second switching unit that switches between a secured state and a released state of the second electrode group, and each of the first electrode group and the second electrode group can be switched between the secured state and the released state.

Advantageous Effect of Invention

According to the present invention, it is possible to reduce a burden on a user during replacement work as compared with conventional techniques. Problems, configurations and effects other than those described above will be clarified by the following description of Examples.

BRIEF DESCRIPTION OF DRAWINGS

FIGS. 6A-6B include drawings comparing a secured state with a released state of the first electrode group in the electrolyte analyzer of Example 1.

FIG. 7 is a drawing illustrating a state where the second electrode group is released by a second press switching unit in the electrolyte analyzer of Example 1.

DESCRIPTION OF EMBODIMENTS

Figure 1:
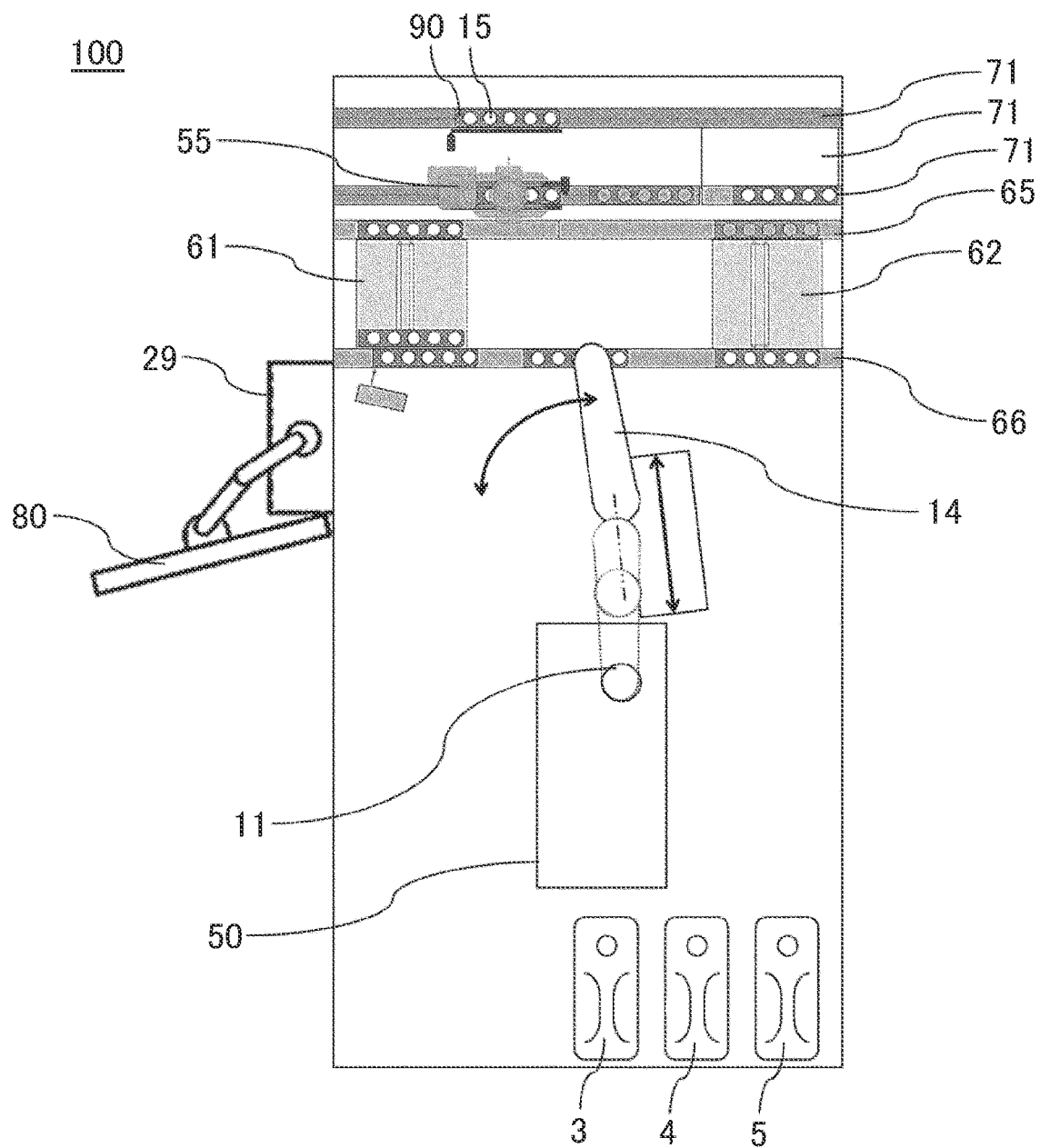
FIG. 1 is a drawing illustrating an overall configuration of an electrolyte analyzer of Example 1 of the present invention.

Hereinafter, Examples of an electrolyte analyzer of the present invention are described with reference to the accompanying drawings. In the drawings used in the present specification, the same or corresponding components are denoted by the same or similar reference signs, and repeated descriptions of these components may be omitted.

Example 1

Example 1 of the electrolyte analyzer of the present invention is described with reference to FIGS. 1 to 9.

Figure 2:
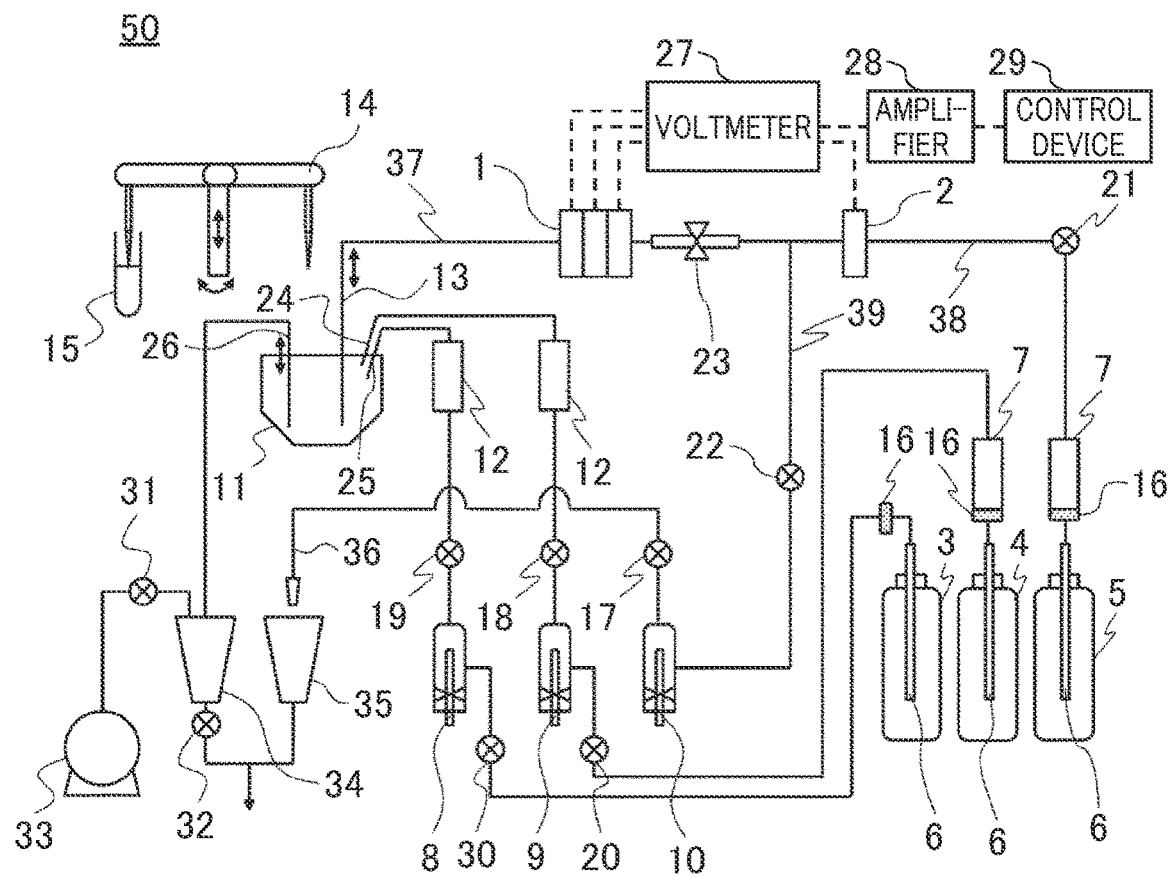
FIG. 2 is a drawing illustrating a schematic configuration of an analysis chamber in the electrolyte analyzer of Example 1.

First, an overall configuration of an electrolyte analyzer and a configuration of a main section of the electrolyte analyzer are described with reference to FIGS. 1 and 2. FIG. 1 is a drawing illustrating the overall configuration of the electrolyte analyzer of Example 1, and FIG. 2 is a drawing illustrating a schematic configuration of an analysis chamber in the electrolyte analyzer.

The electrolyte analyzer 100 illustrated in FIG. 1 includes a conveyance line 71, a gripper 55, dispensing lines 65 and 66, a pre-analysis buffer 61, a post-analysis buffer 62, two analysis chambers 50, a sample probe 14, a display unit 80, a control unit 29, and the like.

The conveyance line 71 is a device disposed at an end portion of the analyzer and configured to convey a conveying container 90, which has loaded thereon a plurality of sample containers 15 storing a sample injected from a sample injector (not illustrated), to a conveyance position by the gripper 55, and to unload the conveying container 90 for which measurement has been completed.

In the present Example, an example in which the plurality of sample containers 15 are loaded on the conveying container 90 is described. However, one or more sample containers 15 may be loaded on the conveying container 90. Another example of the conveying container 90 is a sample holder capable of holding one sample container 15, or the like.

The gripper 55 is a mechanism for conveying the conveying container 90 from the conveyance line 71 to the dispensing lines 65 and 66 or from the dispensing lines 65 and 66 to the conveyance line 71.

The dispensing lines 65 and 66 are mechanisms for conveying the sample containers 15 targeted for dispensing and loaded on the transport container 90 to a dispensing position by the sample probe 14, or for conveying the conveying container 90 having loaded thereon the sample containers 15 after dispensing to the post-analysis buffer 62.

The pre-analysis buffer 61 and the post-analysis buffer 62 are spaces in which a sample container 15 for which dispensing to the analysis chamber 50 is to be performed and a sample container 15 after completion of an analysis operation stand by until being conveyed to another location.

The analysis chamber 50 is an analyzer having an ISE electrode 1 that measures the concentration of an electrolyte of a sample. Details thereof are described with reference to FIG. 2. The number of analysis chambers 50 disposed in the electrolyte analyzer 100 is not limited to one and can be two or more.

The analysis chamber 50 illustrated in FIG. 2 is a flow-type analysis chamber using an ion selective electrode.

FIG. 2 illustrates five mechanisms, which are a sample dispensing section, an electrode section, a reagent section, a mechanism section, and a waste liquid mechanism as main mechanisms of the analysis chamber 50, and a control unit 29 that controls these mechanisms, calculates the concentration of an electrolyte based on a measurement result, and performs display control.

The sample dispensing section includes the sample probe 14. A sample such as a patient sample held in a sample container 15 is dispensed and drawn into the analyzer by the sample probe 14. The sample is a general term for an analysis target collected from a patient's body, and is, for example, blood, urine, or the like. An object to be analyzed that has undergone a predetermined pretreatment is also called a sample.

The electrode section includes a dilution tank 11, a sipper nozzle 13, a dilute solution nozzle 24, an internal standard solution nozzle 25, the ISE electrode 1, a reference electrode 2, a pinch valve 23, a voltmeter 27, and an amplifier 28. The sample dispensed by the sample dispensing section is ejected into the dilution tank 11 and diluted and stirred with a dilute solution ejected from the dilute solution nozzle 24 into the dilution tank 11.

The sipper nozzle 13 is connected to the ISE electrode 1 via a first flow passage 37. The diluted sample solution aspirated from the dilution tank 11 is sent to the ISE electrode 1 through the first flow passage 37.

Meanwhile, a reference electrode solution stored in a reference electrode solution bottle 5 is sent to the reference electrode 2 through a second flow passage 38 by operating a sipper syringe 10 in a state in which the pinch valve 23 is closed. The diluted sample solution sent to an ISE electrode flow passage and the reference electrode solution sent to the reference electrode flow passage come into contact with each other, whereby the ISE electrode 1 and the reference electrode 2 become electrically conductive with each other. The electrode section measures the concentration of a specific electrolyte contained in the sample based on a potential difference between the ISE electrode 1 and the reference electrode 2.

Specifically, an ion sensitive membrane with a property that electromotive force changes according to the concentrations of specific ions (for example, a sodium ion (Na+), a potassium ion (K+), a chlorine ion (Cl-), and the like) contained in the sample solution is attached to the ISE electrode 1. The ISE electrode 1 outputs electromotive force according to each of the ion concentrations in the sample solution, and the voltmeter 27 and the amplifier 28 acquire electromotive force between the ISE electrode 1 and the reference electrode 2. The control unit 29 calculates each of the ion concentrations in the sample from the acquired electromotive force and displays the calculated ion concentrations. The sample solution remaining in the dilution tank 11 is discharged by the waste liquid mechanism.

The potential difference between the ISE electrode 1 and the reference electrode 2 is easily affected by an effect such as a change in temperature. To correct a variation in the potential caused by the effect such as a change in temperature, in a time period after the measurement of one sample and before the measurement of the next sample, the internal standard solution is ejected from the internal standard solution nozzle 25 into the dilution tank 11, and measurement is performed in the same manner as in the case of the sample described above. It is preferable to perform the correction according to the amount of variation using the result of the internal standard solution measurement performed between the sample measurements. In this case, the dilution of the internal standard solution is not performed.

The reagent section includes an aspiration nozzle 6 for aspirating a reagent from a reagent container, a degassing mechanism 7, and a filter 16 and supplies a reagent necessary for measurement. In a case where electrolyte measurement is performed, three types of reagents, which are the internal standard solution, the dilute solution, and the reference electrode solution, are used as reagents, and an internal standard solution bottle 3 storing the internal standard solution, a dilute solution bottle 4 storing the dilute solution, and the reference electrode solution bottle 5 storing the reference electrode solution are set in the reagent section. FIG. 2 illustrates this state. In a case where the analyzer is cleaned, a cleaning liquid bottle storing a cleaning liquid is set in the reagent section.

The internal standard solution bottle 3 and the dilute solution bottle 4 are connected to the internal standard solution nozzle 25 and the dilute solution nozzle 24 via the filter 16 and flow passages, respectively, and the nozzles are disposed such that tips of the nozzles are introduced in the dilution tank 11. The reference electrode solution bottle 5 is connected to the reference electrode 2 via the filter 16 and a flow passage.

The degassing mechanism 7 is connected to the flow passage between the dilute solution bottle 4 and the dilution tank 11 and to the flow passage between the reference electrode solution bottle 5 and the reference electrode 2, and a degassed reagent is supplied into the dilution tank 11 and the reference electrode 2. Since the reagent is aspirated upward from the bottle by setting the flow passages to negative pressure by a syringe, gas dissolved in the reagent appears as bubbles in the reagent. The degassing mechanism is provided to prevent the reagent with bubbles from being supplied into the dilution tank 11 and the reference electrode 2.

The mechanism section includes an internal standard solution syringe 8, a dilute solution syringe 9, the sipper syringe 10, solenoid valves 17, 18, 19, 20, 21, 22, and 30, and preheating 12, and performs operations such as liquid sending in each mechanism or between the mechanisms. For example, the internal standard solution and the dilute solution are sent to the dilution tank 11 by operations of the internal standard solution syringe 8, the dilute solution syringe 9, and the solenoid valves disposed in flow passages. The preheating 12 controls the temperatures of the internal standard solution and the dilute solution to be sent to the ISE electrode 1 to a certain range so as to suppress an effect of the temperatures on the ISE electrode 1.

The waste liquid mechanism includes a first waste liquid nozzle 26, a second waste liquid nozzle 36, a vacuum bin 34, a waste liquid receptacle 35, a vacuum pump 33, and solenoid valves 31 and 32, and discharges the sample solution remaining in the dilution tank 11 and a reaction solution remaining in the flow passages of the electrode section through a third flow passage 39.

Returning to FIG. 1, the display unit 80 includes a liquid crystal display or the like on which various screens such as an operation screen for ordering a measurement item for measurement on a sample to be measured, and a screen for checking a result of the measurement are displayed.

A printer or the like may be provided instead of the liquid crystal display. Alternatively, a display and a printer may be provided, or a touch panel display for setting various parameters based on an operation screen displayed, and entering a measurement result, request information of measurement, instructions to start and stop analysis, and the like may be provided.

The control unit 29 is connected to the analysis chamber 50 and the like via a wired or wireless network line and controls operations in the electrolyte analyzer 100 including the analysis chamber 50. In addition, the control unit 29 performs calculation using the potential of the ISE electrode 1 for which the sample solution was measured, and calculates the concentrations of the electrolytes in the sample. In this case, the concentrations of the electrolytes are more accurately measured by performing calibration based on the potential of the ISE electrode for which the internal standard solution was measured.

The control unit 29 can be a computer including a central processing unit (CPU), a random access memory (RAM), a storage unit, and an I/O port. The RAM, the storage unit, and the I/O port are configured to exchange data with the CPU via an internal bus. The I/O port is connected to the mechanisms described above and controls the operations of the mechanisms. The operation control is performed by reading a program stored in the storage unit and executing the read program by the CPU. In addition, an input/output unit is connected to the control unit 29 such that input from a user and a measurement result can be displayed.

Next, an operation of measuring the concentration of an electrolyte by an electrolyte measuring device illustrated in FIG. 2 is described. The measurement operation is controlled by the control unit 29.

First, a sample dispensed from a sample container 15 by the sample probe 14 of the sample dispensing section is ejected into the dilution tank 11 of the electrode section. After the sample is dispensed into the dilution tank 11, the dilute solution is ejected from the dilute solution bottle 4 by the operation of the dilute solution syringe 9 to dilute the sample. As described above, to prevent bubbles from being formed due to a change in temperature of the dilute solution in the flow passage or due to pressure applied to the dilute solution in the flow passage, a degassing treatment is performed by the degassing mechanism 7 attached in the middle of a dilute solution flow passage. The diluted sample solution is aspirated to the ISE electrode 1 by the operation of the sipper syringe 10 and the operation of the solenoid valve 22.

Meanwhile, the reference electrode solution is sent from the reference electrode solution bottle 5 into the reference electrode 2 by the pinch valve 23 and the sipper syringe 10. The reference electrode solution is, for example, an aqueous solution containing potassium chloride (KCl) at a predetermined concentration. When the sample solution comes into contact with the reference electrode solution, the ISE electrode 1 and the reference electrode 2 become electrically conductive with each other. It is desirable that the concentration of an electrolyte in the reference electrode solution be high in order to suppress an effect of a variation in the concentration during the sending of the sample. However, since the reference electrode solution may crystallize and cause clogging of the flow passage when the concentration is close to the saturated concentration, it is desirable that the concentration be in a range of 0.5 mmol/L to 3.0 mmol/L. The potential of the ISE electrode with respect to the potential of the reference electrode as a reference is measured using the voltmeter 27 and the amplifier 28.

In addition, the internal standard solution in the internal standard solution bottle 3 set in the reagent section before and after the sample measurement is ejected into the dilution tank 11 by the internal standard solution syringe 8, and the concentration of an electrolyte in the internal standard solution is measured in the same manner as the sample measurement.

Figure 3:
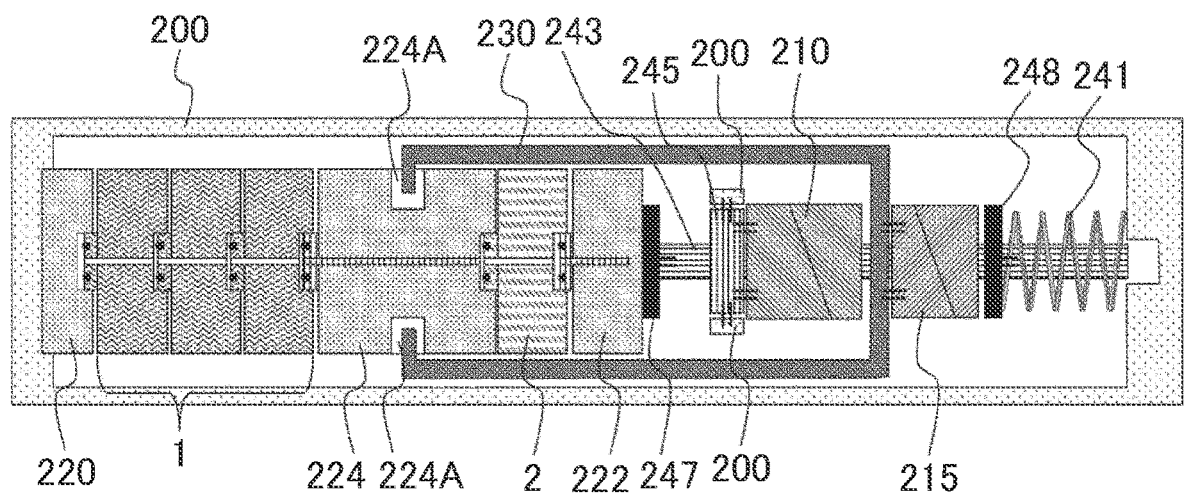
FIG. 3 is a drawing illustrating a structure around electrodes in the electrolyte analyzer of Example 1 and illustrating a state where both a first electrode group and a second electrode group are secured.
Figure 4:
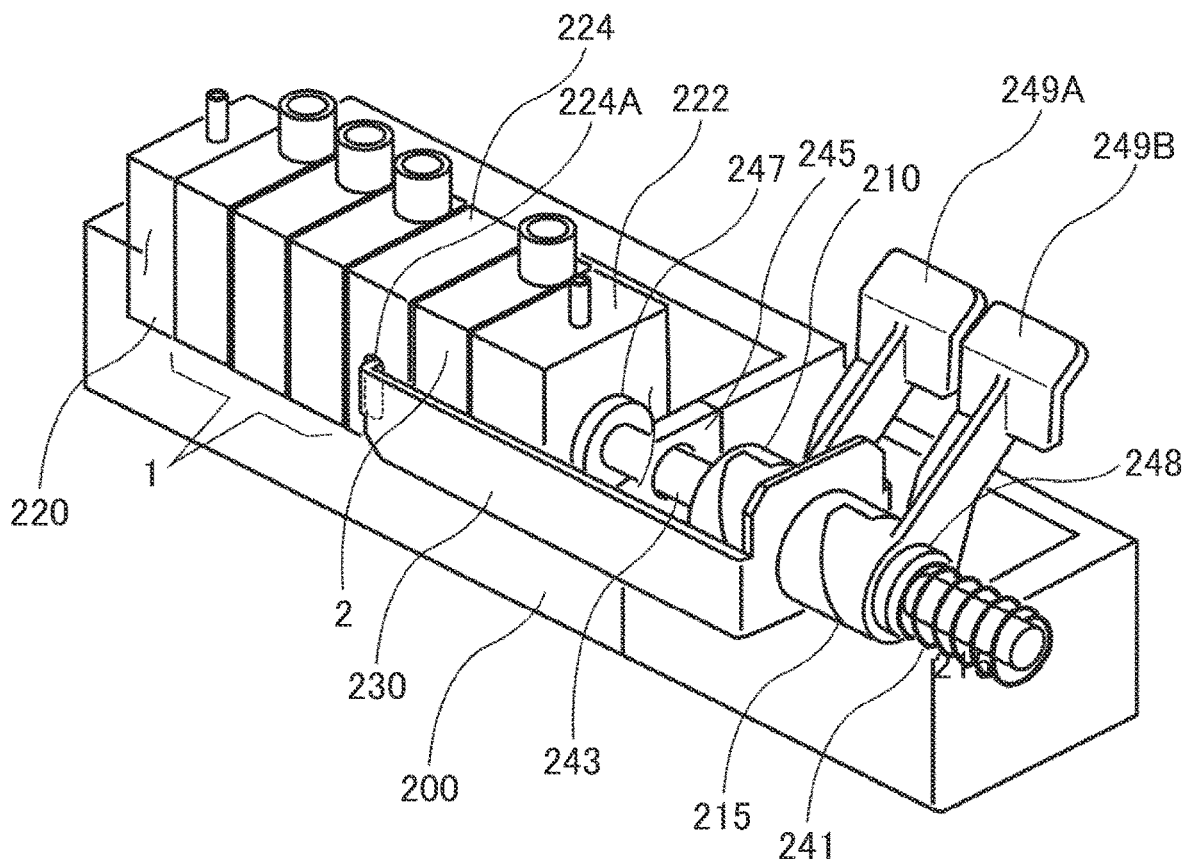
FIG. 4 is a partial transparent perspective view illustrating the structure around electrodes in the electrolyte analyzer of Example 1.
Figure 5:
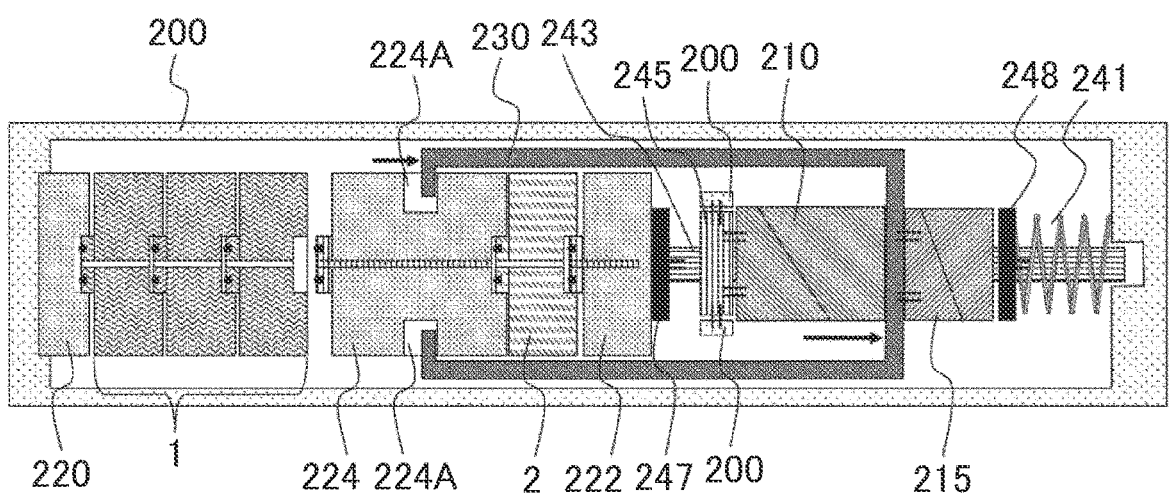
FIG. 5 is a drawing illustrating a state where the first electrode group is released by a first press switching unit in the electrolyte analyzer of Example 1.
Figure 8A:
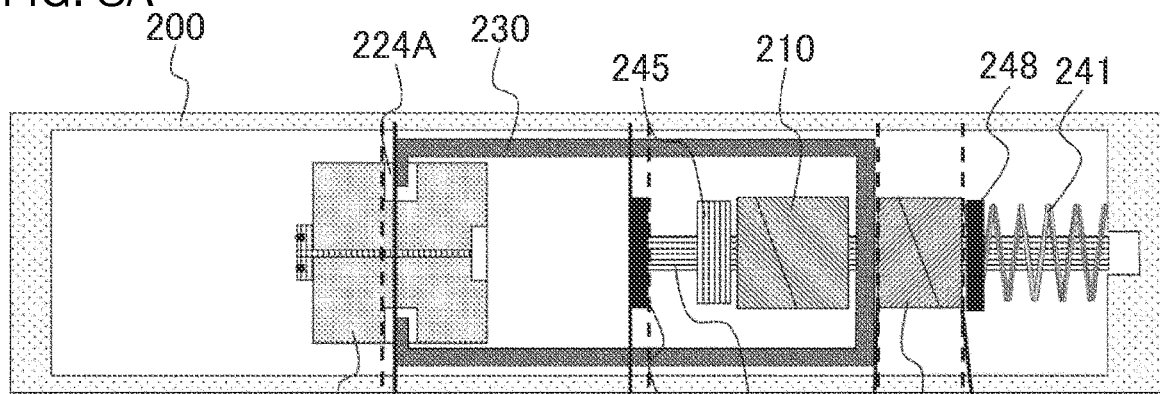
FIGS. 8A-8B include drawings comparing a secured state with a released state of the second electrode group in the electrolyte analyzer of Example 1.
Figure 8B:
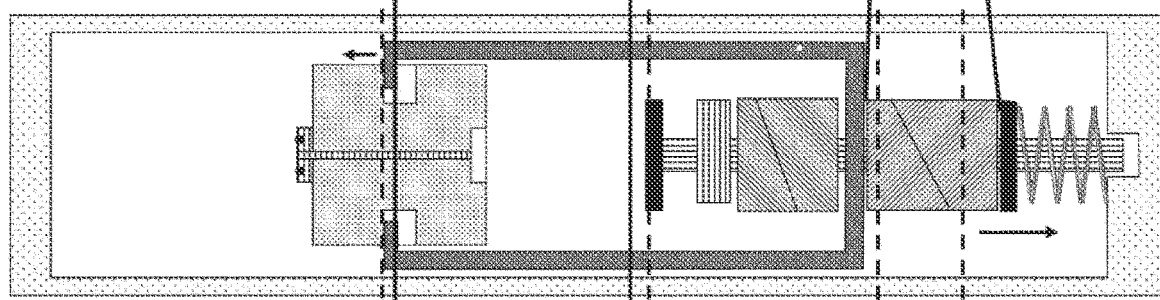
Figure 9:
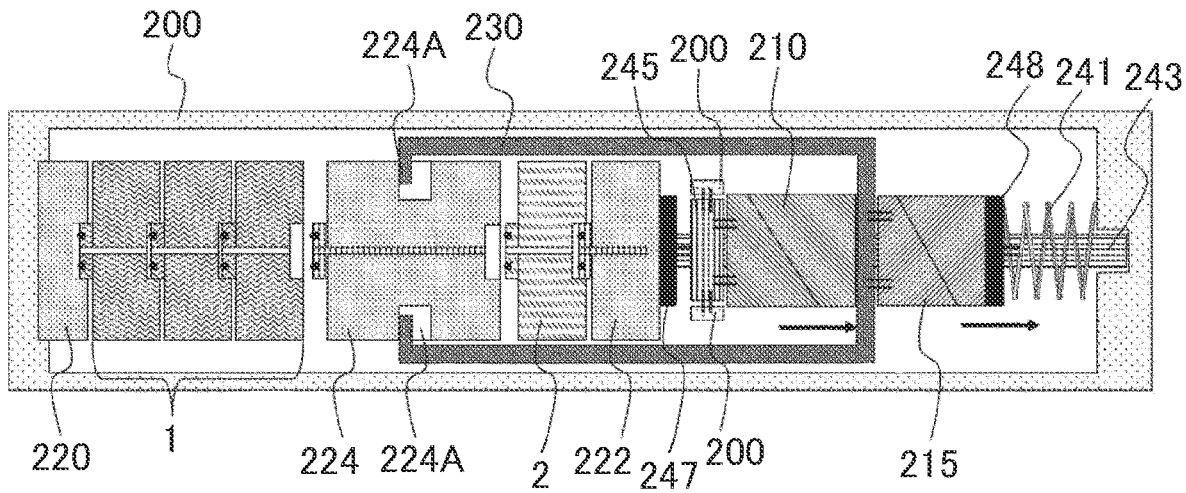
FIG. 9 is a drawing illustrating a state where the first electrode group and the second electrode group are released by the first press switching unit and the second press switching unit in the electrolyte analyzer of Example 1.

Next, the structure of the analysis chamber 50 of the present invention is described in detail with reference to FIGS. 3 to 9. FIG. 3 is a drawing illustrating a structure around the electrodes in the electrolyte analyzer of Example 1. FIG. 4 is a perspective view illustrating the structure around the electrodes in the electrolyte analyzer of Example 1 and illustrating an internal structure partially viewed through an outer wall portion. FIG. 5 is a drawing illustrating a state where a first electrode group is released by a first press switching unit. FIGS. 6A-6B includes drawings comparing a secured state with a released state of the first electrode group. FIG. 7 is a drawing illustrating a state where a second electrode group is released by a second press switching unit. FIGS. 8A-8B includes drawings comparing a secured state with a released state of the second electrode group. FIG. 9 is a drawing illustrating a state where the first electrode group and the second electrode group are released by the first press switching unit and the second press switching unit.

In the electrolyte analyzer 100 of the present Example, as illustrated in FIG. 3, the ISE electrode 1 forming the first electrode group including at least one electrode and the reference electrode 2 different from the ISE electrode 1 and forming the second electrode group including at least one electrode are stored in a housing 200.

As illustrated in FIG. 3, the housing 200 includes a pressing unit, the first press switching unit 210, and the second press switching unit 215. In the housing 200, a first flow passage member 220, the ISE electrode 1, an intermediate flow passage member 224, the reference electrode 2, a second flow passage member 222, and the pressing unit are arranged in this order from the left side in FIG. 3.

Among them, the first press switching unit 210 or the second press switching unit 215 can switch between the secured state and the released state of each of the ISE electrode 1 and the reference electrode 2.

The first press switching unit 210 is a member that switches between the secured state and the released state of the ISE electrode 1. The first press switching unit 210 includes a first member secured to a holding portion 245 secured to the housing 200, and a second member provided with a lever 249A and rotatably supported around a pressing shaft 243. The first member and the second member are in contact with each other via a spiral surface.

When the lever 249A of the second member is rotated in the counterclockwise direction in FIG. 4, the first member and the second member rotate along the spiral surface, and thus the total width of the first and second members in the pressing shaft 243 direction increases. On the other hand, when the lever 249A is rotated in the clockwise direction in FIG. 4, the total width is reduced to the original length. Both of the first member and the second member have shaft holes that are axially movable with respect to the pressing shaft 243 in the axial direction. The lever 249A provided in the second member is a first operation lever.

The second press switching unit 215 is a member that switches between the secured state and the released state of the reference electrode 2. The second press switching unit 215 includes a first member secured to a slider 230, and a second member provided with a lever 249B and rotatably supported around the pressing shaft 243. The lever 249B is a second operation lever.

When the lever 249B of the second member is rotated in the counterclockwise direction in FIG. 4, the first member and the second member rotate along the spiral surface, and thus the total width of the first and second members in the pressing shaft 243 direction increases. On the other hand, when the lever 249B is rotated in the clockwise direction in FIG. 4, the total width is reduced to the original length. The lever 249B provided in the second member is the second operation lever. Both of the first member and the second member have the shaft holes that are axially movable with respect to the pressing shaft 243 in the axial direction. The pressing shaft 243 penetrates through the shaft holes.

The levers 249A and 249B extend in a direction away from the pressing shaft 243 and can reduce force applied to tips of the levers when the second member is rotated along the spiral surface. In addition, since the tips of the levers are widened so that the operator can put his or her finger on them easily, the electrolyte analyzer that can be easily used can be provided.

The first flow passage member 220 is secured to the housing 200. The first flow passage member 220 has a flow passage connected to the first flow passage 37 connected to the sipper nozzle 13 and the dilution tank 11 outside the housing 200. The ISE electrode 1 is pressed against the first flow passage member 220 by the pressing unit so as to be kept in the secured state during measurement.

The second flow passage member 222 has a flow passage connected to the second flow passage 38 connected to the reference electrode solution bottle 5 and is not secured to the housing 200 and the like. Therefore, the second flow passage member 222 is configured to be able to move toward the first flow passage member 220 side and the first press switching unit 210 side in FIG. 3.

The intermediate flow passage member 224 has a groove 224A that is engaged with the slider 230, a flow passage connected to the third flow passage 39 connected to the waste liquid receptacle 35, and the pinch valve 23. Since the intermediate flow passage member 224 is not secured to the housing 200 and the like in the same manner as the second flow passage member 222, the intermediate flow passage member 224 is configured to be able to move toward the first flow passage member 220 side and the first press switching unit 210 side in FIG. 3. A direction toward which the ISE electrode 1 or the reference electrode 2 is pressed by the intermediate flow passage member 224 is switched by the first press switching unit 210 or the second press switching unit 215.

The slider 230 is a member that is disposed between the first press switching unit 210 and the second press switching unit 215, is driven in accordance with the switching by the first press switching unit 210 and the second press switching unit 215 so as to move the intermediate flow passage member 224 toward the first flow passage member 220 side and the first press switching unit 210 side in FIG. 3.

Tips of the slider 230 on the first flow passage member 220, that is, on the left side in FIG. 3 are bent inward so as to face each other and be close to each other. Bent portions of the tips of the first flow passage member 220 can be inserted into the intermediate flow passage member 224, the intermediate flow passage member 224 has a groove 224 larger than the bent portions, and a gap is provided between the groove 224A and the slider 230 in a secured state described later. Meanwhile, when the first press switching unit 210 performs switching, the slider 230 comes into contact with a side of the groove 224 in the vicinity of the reference electrode 2, and the ISE electrode 1 is switched to the released state while the reference electrode 2 is kept in a secured state. When the second press switching unit 215 performs switching, the slider 230 comes into contact with a side of the groove 224A in the vicinity of the ISE electrode 1, and the reference electrode 2 is switched to the released state while the ISE electrode 1 is kept in the secured state.

The pressing unit is a member that presses the ISE electrode 1 and the reference electrode 2 against one another and includes a spring 241, the pressing shaft 243, the holding portion 245, a pressing end 247, a spring bearing 248, and the like.

The spring 241 is a member that applies force toward the first flow passage member 220 by elastic force to the spring bearing 248 secured to the pressing shaft 243 in FIG. 3. A case where a coil spring is used as the spring 241 is exemplified as illustrated in FIG. 3. However, the spring 241 is not limited to a coil spring. A conical spring (since its length when the spring is compressed is short, there is an effect of reducing a length in the longitudinal direction of the housing) or another elastic member can be used as the spring 241.

The pressing shaft 243 is inserted into the holding 245, the first press switching unit 210, and the second press switching unit 215 in this order. The pressing shaft 243 is moved in the longitudinal direction of the shaft by the switching of the first press switching unit 210 or the second press switching unit 215.

The holding portion 245 is secured to the housing 200 and has a hole in which the pressing shaft 243 slides. The holding portion 245 serves as a reference surface of the first member of the first press switching unit 210. In addition, the holding portion 245 can receive elastic force of the spring 241.

The pressing end 247 is secured to the pressing shaft 243 and presses the second flow passage member 222.

FIG. 3 illustrates a state where the ISE electrode 1 and the reference electrode 2 are in a secured state, that is, in a state during measurement. When the ISE electrode 1 and the reference electrode 2 are housed, the spring 241 is in a compressed state and is in a state of pressing the pressing end 247 via the spring bearing 248 and the pressing shaft 243. That is, the pressing unit applies pressing force to the first flow passage member 220. The ISE electrode 1, the intermediate flow passage member 224, the reference electrode 2, and the second flow passage member 222 are secured by being pressed against the first flow passage member 220 so as to prevent internal liquid from leaking.

The gap is provided between the slider 230 and the groove 224A of the internal flow passage member 224, and the slider 230 does not contribute to the securing of the ISE electrode 1 and the reference electrode 2.

In addition, a gap is provided between the second member of the first press switching unit 210, and the first member and a right surface of the slider 230 in FIG. 3. The second member of the first press switching unit 210 does not contribute to the securing of the ISE electrode 1 and the reference electrode 2. Furthermore, a gap is provided between the second member of the second press switching unit 215 and a left surface of the spring bearing 248 in FIG. 3. The second member of the second press switching unit 215 does not contribute to the securing of the ISE electrode 1 and the reference electrode 2.

FIGS. 5 and 6A-6B illustrate a state where the ISE electrode 1 is in the released state and the reference electrode 2 is in the secured state. The width of the first press switching unit 210 is increased by switching the lever provided in the second member of the first press switching unit 210 from a state where "the ISE electrode 1 and the reference electrode 2 are in the secured state" as illustrated in FIG. 6A to a state where "the ISE electrode 1 is in a switched state and the reference electrode 2 is in the secured state" as illustrated in FIG. 6B.

When the width of the first press switching unit 210 increases, the right end surface of the second member comes into contact with the slider 230 and thus the slider 230 is moved rightward. The bent portion of the slider 230 on the left end side is also moved rightward and comes into contact with the right end side of the groove 224A of the intermediate flow passage member 224, and the pressing end 247 is pressed toward the second flow passage member 222, but is no longer moved toward the first flow passage member 220. Therefore, the overall pressing unit is moved toward the side opposite to the pressing end 247 side. In this case, since the slider 230 secured to the second press switching unit 215 is also moved toward the side opposite to the first flow passage member 220, the intermediate flow passage member 224 engaged with the slider 230 via the groove 224A, and the reference electrode 2 and the second flow passage member 222 located between the intermediate flow passage member 224 and the pressing end 247 are moved in the same direction. Therefore, the ISE electrode 1 is switched from the secured state to the released state.

In this case, since the spring 241 applies force to the pressing end 247 so as to press the reference electrode 2 and the second flow passage member 222, the reference electrode 2 is kept sandwiched between the intermediate flow passage member 224 and the second flow passage member 222 by the pressing end 247. That is, even when the ISE electrode 1 is switched from the secured state to the released state, the reference electrode 2 is kept in the secured state.

FIGS. 7 and 8A-8B illustrate a state where the ISE electrode 1 is in the secured state, but the reference electrode 2 is in the released state. The width of the second press switching unit 215 is increased by switching the lever provided in the second member of the second press switching unit 215 from a state where "the ISE electrode 1 and the reference electrode 2 are in the secured state" as illustrated in FIG. 8A to a state where "the ISE electrode 1 is in the secured state and the reference electrode 2 is in a switched state" as illustrated in FIG. 8B.

When the width of the second press switching unit 215 is increased, the slider 230 secured to the second press switching unit 215 is also pressed toward the first flow passage member 220, and is moved toward the first flow passage member 220 until the slider 230 interferes with the groove 224A of the intermediate flow passage member 224. After the interference, the slider 230 cannot move toward the first flow passage member 220. Therefore, the overall pressing unit is moved toward the side opposite to intermediate flow passage member 224, and the reference electrode 2 is switched from the secured state to the released state.

In this case, since the spring 241 applies force toward the intermediate flow passage member 224 to the slider 230, the slider 230 interferes with the groove 224A of the intermediate flow passage member 224, and the intermediate flow passage member 224 presses the ISE electrode 1 toward the first flow passage member 220. Therefore, the ISE electrode 1 is kept in the secured state.

FIG. 9 illustrates a state where both of the ISE electrode 1 and the reference electrode 2 are in the released state. After the ISE electrode 1 is switched from the secured state to the released state as illustrated in FIGS. 5 and 6A-6B described above, the reference electrode 2 is switched from the secured state to the released state as illustrated in FIGS. 7 and 8A-8B. Alternatively, the electrodes are switched from the secured state to the released state in reverse order.

Next, effects of the present Example are described.

The above-described electrolyte analyzer 100 of Example 1 of the present invention includes the ISE electrode 1 including at least one electrode, the reference electrode 2 different from the ISE electrode 1 and including at least one electrode, and the housing 200 housing the electrodes of the ISE electrode 1 and the reference electrode 2. The housing 200 includes the pressing unit that presses the electrodes against one another, the first press switching unit 210 that switches between the secured state and the released state of the ISE electrode 1, and the second press switching unit 215 that switches between the secured state and the released state of the reference electrode 2. Thus, the housing 200 can switch between the secured state and the released state of each of the ISE electrode 1 and the reference electrode 2.

Therefore, for example, in a case where the ISE electrode 1 is attached or detached, pressing toward the ISE electrode 1 can be released while the close contact of the reference electrode 2 is kept, and each of the ISE electrode 1 and the reference electrode 2 can be attached or detached while the other electrode is kept in the secured state. Therefore, leakage locations can be reduced compared to conventional techniques, cleaning of the side where the secured state is kept is unnecessary, and thus the user's burden in the replacement work can be greatly reduced compared to conventional device configurations.

In addition, since the ISE electrode 1 and the reference electrode 2 can be released simultaneously, all the electrodes can be detached. Therefore, it is easy to clean the overall inside of the housing 200, and it is possible to the electrolyte analyzer that can be easily cleaned and easily used.

In the present Example, since the lever 249A that is operated to attach and detach the ISE electrode 1, and the lever 249B that is operated to attach and detach the reference electrode 2 are arranged adjacent to each other, it suffices for the operator to reach roughly the same place in order to replace any of the electrodes. In addition, when both of the levers are rotated to attach or detach the electrodes in the same direction, the attachment or detachment operations are the same and the operability is improved.

In addition, for example, as illustrated in FIG. 3, since the arrangement of the electrodes is the same as the arrangement of the corresponding levers such that the ISE electrode 1 is arranged on the left side, the reference electrode 2 is arranged on the right side, the lever 249A that is operated to attach and detach the ISE electrode 1 is arranged on the left side, and the lever 249B that is operated to attach and detach the reference electrode 2 is arranged on the right side, it is possible to reduce operation errors and provide the electrolyte analyzer with excellent operability.

Example 2

Figure 10:
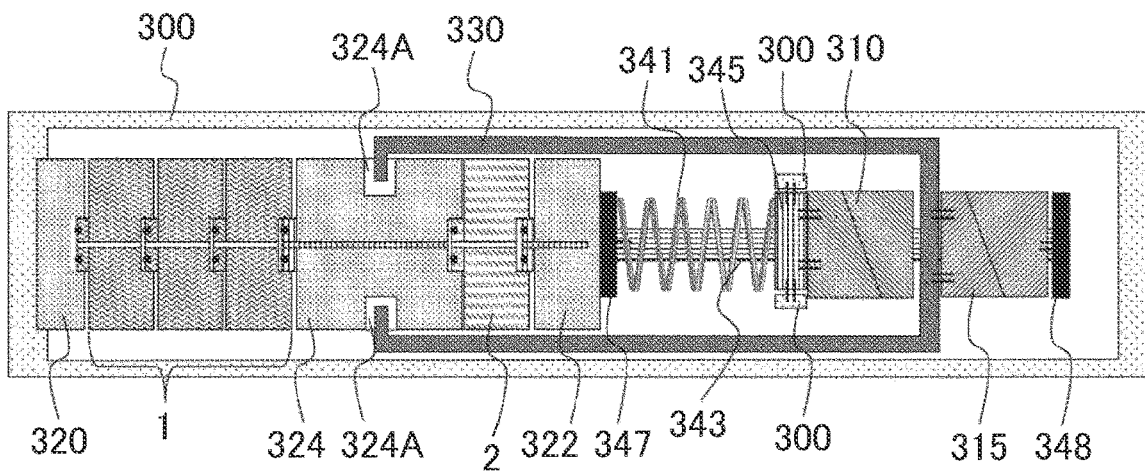
FIG. 10 is a drawing illustrating a structure around electrodes in an electrolyte analyzer of Example 2 of the present invention.
Figure 11:
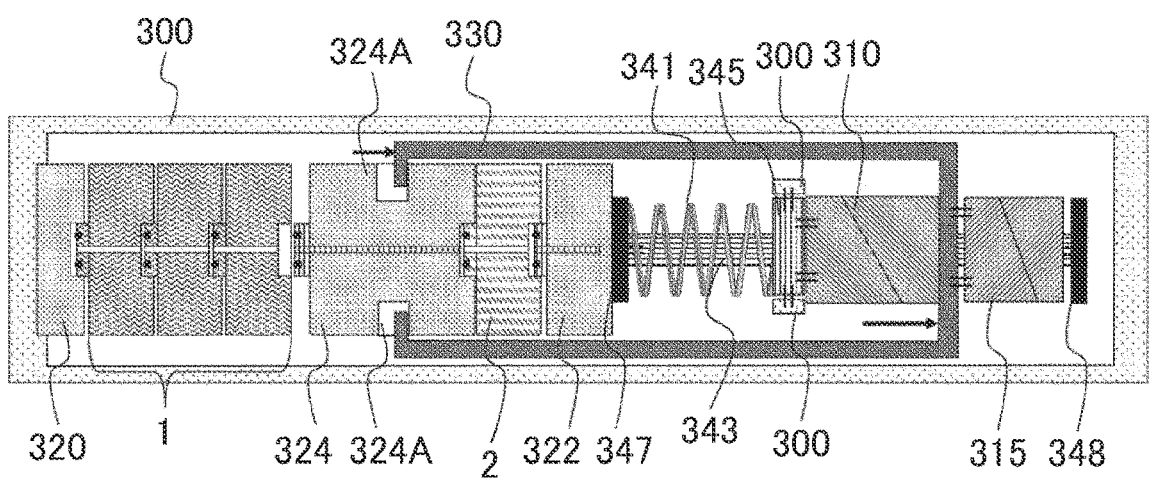
FIG. 11 is a drawing illustrating a state where a first electrode group is released by a first press switching unit in the electrolyte analyzer of Example 2.
Figure 12:
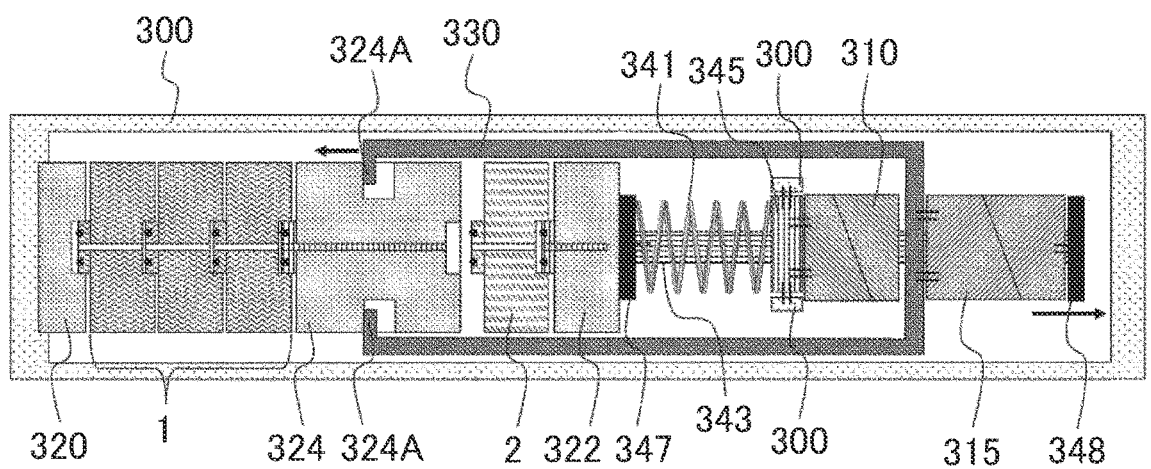
FIG. 12 is a drawing illustrating a state where a second electrode group is released by a second press switching unit in the electrolyte analyzer of Example 2.

An electrolyte analyzer of Example 2 of the present invention is described with reference to FIGS. 10 to 12. FIG. 10 is a drawing illustrating a structure around electrodes in the electrolyte analyzer of Example 2. FIG. 11 is a drawing illustrating a state where a first electrode group is released by a first press switching unit. FIG. 12 is a drawing illustrating a state where a second electrode group is released by a second press switching unit.

While the spring 241 is provided at the extreme end in the electrolyte analyzer 100 of Example 1, a pressing unit includes a spring 341, a pressing shaft 343, a holding portion 345, pressing ends 347 and 348, and the like in an analysis chamber 50 of the electrolyte analyzer 100 of the present Example as illustrated in FIG. 10. The spring 341 is disposed between the holding portion 345 and the pressing end 347, the pressing end 347 forms one end on a second flow passage member 322 side, and the pressing end 348 forms the other end.

A housing 300, a first press switching unit 310, a second press switching unit 315, a first flow passage member 320, a second flow passage member 322, an intermediate flow passage member 324, a groove 324A thereof, the pressing shaft 343, and the holding portion 345 have substantially the same configurations as those of the housing 200, the first press switching unit 210, the second press switching unit 215, the first flow passage member 220, the second flow passage member 222, the intermediate flow passage member 224, the groove 224A thereof, the pressing shaft 243, and the holding portion 245 of Example 1.

In the present Example, as illustrated in FIG. 11, the width of the first press switching unit 310 is increased by switching a lever of a second member of the first press switching unit 310. A right end surface of the second member comes into contact with the slider 330 so as to move the slider 330 rightward, and a bent portion of a left end side of the slider 330 is also moved rightward to come into contact with a right end side of the groove 324A of the intermediate flow passage member 324. In this case, the pressing end 347 is also pressed toward the second flow passage member 322, but is no longer moved, and thus the overall pressing unit is moved toward the side opposite to the second flow passage member 322. In this case, since the slider 330 is also moved toward the side opposite to the second flow passage member 322, the intermediate flow passage member 324 engaged with the slider 330 via the groove 324A, the reference electrode 2, and the second flow passage member 322 are moved together with the slider 330 in the same direction. Therefore, the ISE electrode 1 is switched from a secured state to a released state.

Meanwhile, since the spring 341 applies force toward the second flow passage member 322 side to the pressing unit, the reference electrode 2 remains pressed against the intermediate flow passage member 324 by the pressing end 347 of the pressing unit, and thus the reference electrode 2 is kept in the secured state even when the ISE electrode 1 is switched to the released state.

In addition, as illustrated in FIG. 12, the width of the second press switching unit 315 is increased by switching the second member of the second press switching unit 315 by the lever. In this case, the slider 330 secured to the second press switching unit 315 is pressed toward the first flow passage member 320, and is moved toward the first flow passage member 320 until the groove 324A of the intermediate flow passage member 324 interferes. After the interference, since the slider 330 cannot move toward the first flow passage member 320, the overall pressing unit is moved toward the side opposite to the intermediate flow passage member 324 side, and the reference electrode 2 is switched from the secured state to the released state.

In this case, since the spring 341 applies force toward the intermediate flow passage member 324 to the slider 330, the slider 330 interferes with the groove 324 of the intermediate flow passage member 324, and the intermediate flow passage member 324 presses the ISE electrode 1 toward the first flow passage member 320 side. Therefore, the ISE electrode 1 is kept in the secured state.

Other configurations and operations are substantially the same as the configurations and operations of the electrolyte analyzer of Example 1, and details thereof are omitted.

Even in the electrolyte analyzer of Example 2 of the present invention, effects that are substantially the same as those of the electrolyte analyzer of Example 1 can be obtained.

Example 3

Figure 13:
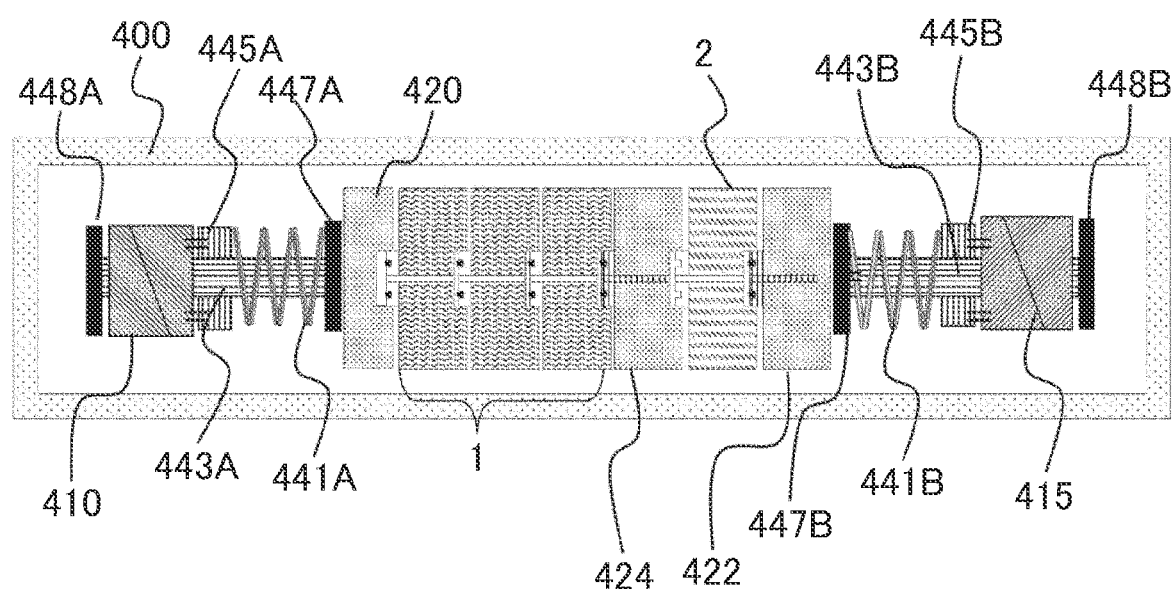
FIG. 13 is a drawing illustrating a structure around electrodes in an electrolyte analyzer of Example 3 of the present invention.

The electrolyte analyzer of Example 3 of the present invention is described with reference to FIG. 13. FIG. 13 is a drawing illustrating a structure around electrodes in an electrolyte analyzer of Example 3.

As illustrated in FIG. 13, in a housing 400 in the electrolyte analyzer 100 of the present Example, an ISE electrode 1 and a reference electrode 2 are housed in the same manner, but a configuration of a pressing unit is different from Examples 1 and 2.

As illustrated in FIG. 13, the pressing unit in the housing 400 of the present Example includes a first pressing unit in which a first press switching unit 410 is inserted and a second pressing unit in which a second press switching unit 415 is inserted. An intermediate flow passage member 424 is secured to the housing 400.

The first pressing unit includes a pressing shaft 443A in which the first press switching unit 410 is inserted, pressing ends 447A and 448A secured to the pressing shaft 443A, and the like, which are not secured to the housing 400, except for a holding portion 445A. A spring 441A that applies force in a predetermined direction is stretched between the pressing end 447A and the holding portion 445A.

The second pressing unit includes a pressing shaft 443B in which the second press switching unit 415 is inserted, pressing ends 447B and 448B secured to the pressing shaft 443B, and the like, which are not secured to the housing 400, except for a holding portion 445B. A spring 441B that applies force in a predetermined direction is stretched between the pressing end 447B and the holding portion 445B.

In the present Example, normally, the ISE electrode 1 and a first flow passage member 420 are pressed by the spring 441A via the pressing end 447A against the intermediate flow passage member 424 secured to the housing 400, and thus the ISE electrode 1 is kept in the secured state. In addition, the reference electrode 2 and a second flow passage member 422 are pressed by a spring 441B via the pressing end 447B against the intermediate flow passage member 424, and thus the reference electrode 2 is kept in the secured state.

In a case where the ISE electrode 1 is switched from the secured state to the released state, the width of the first press switching unit 410 is increased by switching a lever of a second member of the first press switching unit 410, and the pressing end 448A is moved leftward in the drawing, that is, in a direction away from the holding portion 445A. Therefore, the pressing end 447A is separated from the first flow passage member 420, pressing force of the ISE electrode 1 toward the intermediate flow passage member 424 is eliminated, and the ISE electrode 1 is switched to the released state. In this case, the state of the reference electrode 2 side is not changed and thus the reference electrode 2 is kept in the secured state.

In a case where the reference electrode 2 is switched from the secured state to the released state, the width of the second press switching unit 415 is increased by switching a lever of a second member of the second press switching unit 415, and the pressing end 448B is moved rightward in the drawing, that is, in a direction away from the holding portion 445B. Therefore, the pressing end 447B is separated from the second flow passage member 422, pressing force of the reference electrode 2 toward the intermediate flow passage member 424 is eliminated, and the reference electrode 2 is switched to the released state. In this case, the state of the ISE electrode 1 side is not changed and thus the ISE electrode 1 is kept in the secured state.

Other configurations and operations are substantially the same as the configurations and operations of the electrolyte analyzer of Example 1, and details thereof are omitted.

Even in the electrolyte analyzer in which the pressing unit in Example 3 of the present invention includes the first pressing unit in which the first press switching unit 410 is inserted and the second pressing unit in which the second press switching unit 415 is inserted, effects that are substantially the same as those of the electrolyte analyzer of Example 1 described above can be obtained.

In addition, in Example 3, the first lever that is operated to attach and detach the ISE electrode 1, and the second lever that is operated to attach and detach the reference electrode 2 are arranged on opposite sides with the housing 300 interposed therebetween. Since the first lever is arranged adjacent to the ISE electrode 1, and the second lever is arranged adjacent to the reference electrode 2, the levers are adjacent to the electrodes to be attached or detached, it is easy to understand the correspondence between the electrode to be attached or detached and the lever to be operated, and it is possible to provide the electrolyte analyzer that can be easily used.

<Others>

It should be noted that the present disclosure is not limited to the examples described above, and includes various modification examples. The examples described above have been described in detail to simply describe the present disclosure, and are not necessarily required to include all the described configurations.

In addition, part of the configuration of one example can be replaced with the configurations of other examples, and in addition, the configuration of the one example can also be added with the configurations of other examples. In addition, part of the configuration of each of the examples can be subjected to addition, deletion, and replacement with respect to other configurations.

LIST OF REFERENCE SIGNS

1 ISE electrode (first electrode group)
2 reference electrode (second electrode group)
3 internal standard solution bottle
4 dilute solution bottle
5 reference electrode solution bottle
6 aspiration nozzle
7 degassing mechanism
8 internal standard solution syringe
9 dilute solution syringe
10 sipper syringe
11 dilution tank
12 preheating
13 sipper nozzle
14 sample probe
15 sample container
16 filter
17, 18, 19, 20, 21, 22, 30, 31, 32 solenoid valve
23 pinch valve
24 dilute solution nozzle
25 internal standard solution nozzle
26 first waste liquid nozzle
27 voltmeter
28 amplifier
29 control device (control unit)
33 vacuum pump
34 vacuum bin
35 waste liquid receptacle
36 second waste liquid nozzle
37 first flow passage
38 second flow passage
39 third flow passage
50 analysis chamber
55 gripper
61 pre-analysis buffer
62 post-analysis buffer
65, 66 dispensing line
71 conveyance line
80 display unit
90 conveying container
100 electrolyte analyzer
200, 300, 400 housing (electrode housing)
210, 310, 410 first press switching unit (first switching unit)
215, 315, 415 second press switching unit (second switching unit)
220, 320, 420 first flow passage member
222, 322, 422 second flow passage member
224, 324, 424 intermediate flow passage member (third flow passage member)
224A, 324A groove
230, 330 slider
241, 341, 441A, 441B spring (pressing unit, elastic body)
243, 343, 443A, 443B pressing shaft (pressing unit, shaft portion)
245, 345, 445A, 445B holding portion (pressing unit, holding portion)
247, 347, 348, 447A, 447B, 448A, 448B pressing end (pressing unit)
248 spring bearing
249A, 249B lever (operation lever)

The invention claimed is:

1. An electrolyte analyzer comprising:
a first electrode group that includes at least one electrode;
a second electrode group that includes at least one electrode different from the first electrode group; and
an electrode housing that houses electrodes of the first electrode group and the second electrode group, and includes:
  a pressing unit configured to press the electrodes against one another, wherein the pressing unit includes at least a spring, a shaft, a first end, a second end, and a holding portion secured to the electrode housing and having a hole which the shaft slides through,
  a first switch configured to switch the first electrode group between a first secured state and a first released state, wherein the first switch includes a first portion secured to the holding portion and a second portion rotatably supported around the shaft and having a first lever,
  a second switch configured to switch the second electrode group between a second secured state and a second released state, wherein the second switch includes a third portion secured to a moveable portion and a fourth portion rotatably supported around the shaft and having a second lever, and
  a spiral surface that connects the first portion, the second portion, the third portion, and the fourth portion, and wherein the first portion, the second portion, the third portion, and the fourth portion are configured to rotate along the spiral surface.

2. The electrolyte analyzer according to claim 1, wherein the electrode housing further includes a first flow passage member that is secured to the electrode housing and includes a flow passage connected to a first flow passage outside of the electrode housing, and the first electrode group is secured by pressing against the first flow passage member by the pressing unit.

3. The electrolyte analyzer according to claim 2, wherein the electrode housing further includes:
  a second flow passage member connected to a second flow passage, and
  a third flow passage member connected to a third flow passage,
the first flow passage member, the first electrode group, the third flow passage member, the second electrode group, the second flow passage member, and the pressing unit are arranged in this order, and
at least one of the first switch or the second switch are configured to switch a direction of pressing the first electrode group or the second electrode group by the third flow passage member.

4. The electrolyte analyzer according to claim 3, wherein
at least one of the first switch or the second switch is inserted through the shaft,
the spring is configured to apply a force to the shaft in a predetermined direction,
the holding portion is adapted to receive the force from the spring, and
each of the first portion, the second portion, the third portion, and the fourth portion include shaft holes that are configured to be axially movable with respect to the shaft in an axial direction.

5. The electrolyte analyzer according to claim 4, wherein
the shaft is inserted into the holding portion, the first switch, and the second switch in this order, and
electrode housing further includes the moveable portion that is disposed on one end between the first switch and the second switch, and the moveable portion is configured to move the third flow passage member.

6. The electrolyte analyzer according to claim 3, wherein
the first lever is configured to operate the first switch and the second lever is configured to operate the second switch, and
the first lever and the second lever are disposed to be adjacent to each other.

7. The electrolyte analyzer according to claim 4, wherein the pressing unit includes:
a first pressing unit includes at least a first shaft having two ends, a first holding portion secured to the electrode housing, and a first spring that is stretched between one of the two ends and the first holding portion, and wherein the first switch is inserted through the first pressing unit, and
a second pressing unit includes at least a second shaft having two ends, a second holding portion secured to the electrode housing, and a second spring that is stretched between one of the two ends and the second holding portion, and wherein the second switch is inserted through the second pressing unit.

8. The electrolyte analyzer according to claim 5, wherein
the third flow passage member is provided with a groove, and an other end of the moveable portion is engaged with the groove,
a clearance is provided between the groove and the moveable portion when the first electrode group is pressed against the first flow passage member,
when the first lever is switched, the moveable portion is configured to contact the groove and switches the first electrode group to the first released state while maintaining the second secured state of the second electrode group, and
when the second lever is switched, the moveable portion is configured to contact the groove and switches the second electrode group to the second released state while maintaining the first secured state of the first electrode group.

* * * * *